(No Model.)
J. J. MARTIN & W. H. BROWNFIELD.
DEVICE FOR DRAWING TIE BANDS AROUND BALES.
No. 481,184. Patented Aug. 23, 1892.
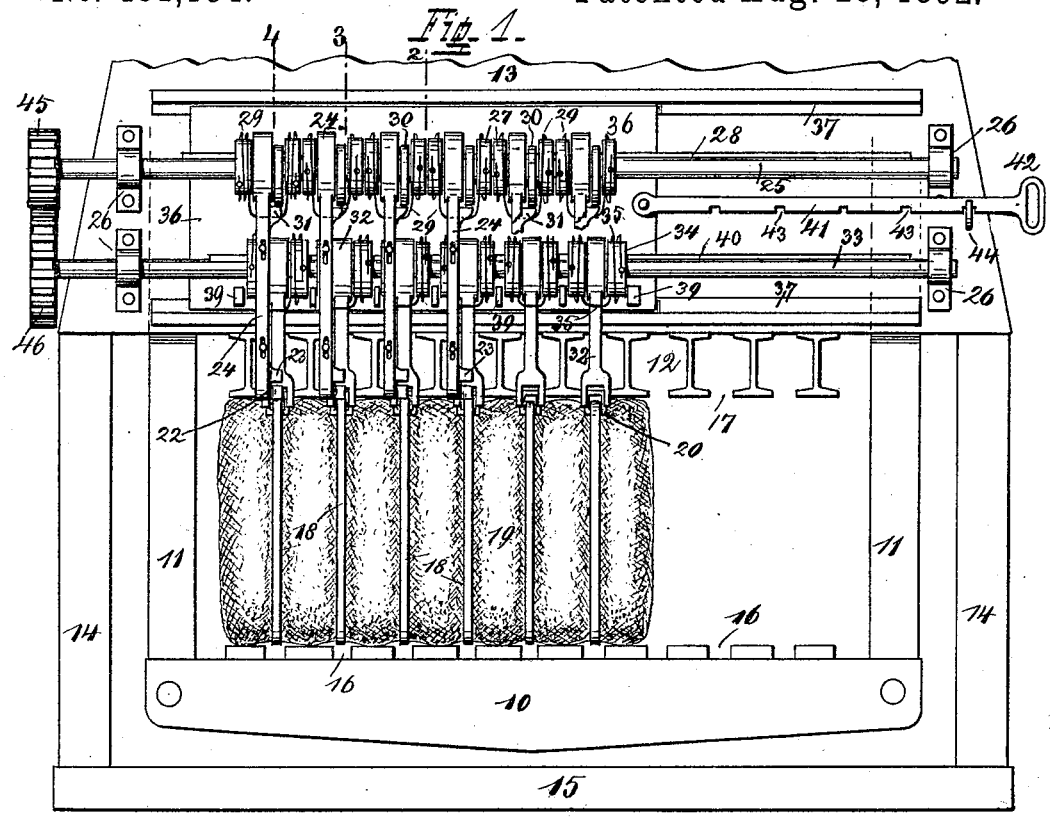
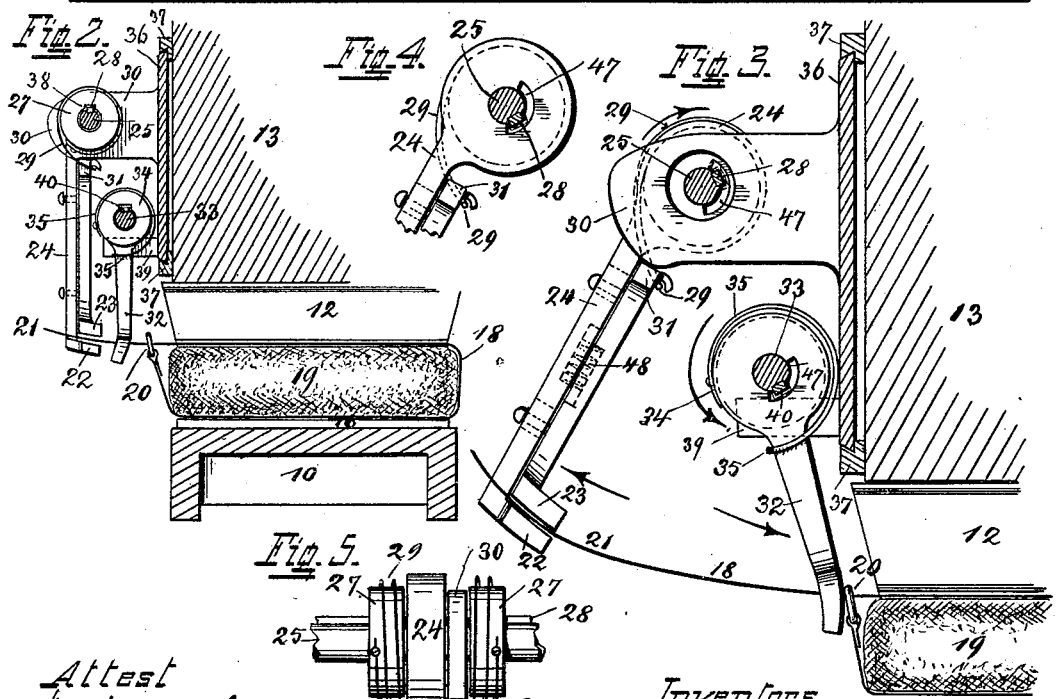

UNITED STATES PATENT OFFICE.

JOSEPH J. MARTIN, OF BELLEVUE, AND WILLIAM H. BROWNFIELD, OF DAYTON, ASSIGNORS OF ONE-THIRD TO LOUIS K. MARTY, OF NEWPORT, KENTUCKY.

DEVICE FOR DRAWING TIE-BANDS AROUND BALES.

SPECIFICATION forming part of Letters Patent No. 481,184, dated August 23, 1892.

Application filed February 27, 1892. Serial No. 423,025. (No model.)

*To all whom it may concern:*

Be it known that we, JOSEPH J. MARTIN, of Bellevue, and WILLIAM H. BROWNFIELD, of Dayton, county of Campbell, State of Kentucky, citizens of the United States, have invented a certain new and useful Device to Draw Tie-Bands Around Bales; and we do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to provide means for drawing tight around packages—such as cotton-bales, for instance—the bands whereby they are held together. This operation is performed while and after the bale is compressed to its smallest thickness and before it is removed from the press. The aim is to reduce bulk, and thereby facilitate transportation. To attain such object, the bands must be drawn around the bales and tied as close to them as possible to prevent them from spreading again after being released from the press. Heretofore the pulling out of the ends of the bands and their drawing together previous to their final tying has been done mostly by hand, unaided by any mechanical means, and the power thus obtained is not sufficient to draw and tie the bands so close around the bales as to keep them within the exact state where the press leaves them and prevent them from spreading again more or less after being released. To overcome this defect and loss and to reduce still more the bulk of the bales, we have devised a mechanism which permits the bands to be drawn around the bales so close as to be satisfactory for the purpose and to reduce their after spreading and swelling to the lowest possible minimum.

It should be mentioned here that we intend to use this invention particularly in connection with so-called "cotton-compressors," which are presses of the most powerful construction, located in cotton-shipping centers, and whereby bales intended for export and already compressed on lighter presses, mostly actuated by animal-power, are re-pressed to reduce their bulk to the smallest possible minimum. The bales so supplied to these presses from various sources are not all compressed to the same density, nor is any bale necessarily packed perfectly even in all its parts, and in consideration of this inequality we have constructed our device so that each band of a bale is drawn so tight as the consistency of the bale and of the particular part of the latter where said band is located requires, which we regard an important advantage over devices where the bands are all drawn to a certain predetermined tension, equal in all, and where no attention is paid to the previous density of the bales. The construction of this mechanism is explained in the following description, pointed out in the claims concluding it, and illustrated in the accompanying drawings, in which—

Figure 1 is a partial front elevation of a cotton-press, the movable platen being shown in its extreme remote position from the stationary platen and with a bale of cotton between them in ready position to be compressed. In this figure only those parts in immediate proximity to the two platens have been shown and all other parts of the press as not entering into this invention have been omitted. Fig. 2 shows a partial cross-section of the same press, taken on line 2 2 of Fig. 1, the movable platen having been drawn up and nearly compressed the bale and the mechanism for drawing the bands tight having commenced to operate. Fig. 3 is a vertical section taken on line 3 3 of Fig. 1, the bale of cotton being completely compressed and the mechanism for drawing the band tight having about completed its operation. Fig. 4 is a vertical section taken on line 4 4 of Fig. 1. Fig. 5 is an enlarged front view of parts of Fig. 2.

10 is the movable platen of a suitable cotton-press, connected by links 11 to the mechanism whereby the press is operated.

12 is the stationary platen, consisting of a number of I-beams secured to the upper part of the general press-frame 13, which frame is supported on pillars 14, rising from a base 15. The upper surface of platen 10 is provided with grooves 16, traversing it clear across and situated vertically below and in line with other grooves 17, formed by the spaces between the I-beams composing platen 12. These grooves and spaces are provided to permit the tie-bands 18 to be passed through and around bale 19 and prevent said bands being held and pressed against the bale, which would interfere with their free manipulation for the purpose of drawing them tight.

The particular manner and means by which the ends of the bands are secured and held together afterward does not enter into this invention, the object of this latter, as already stated, being merely to provide means to draw the bands close around the compressed bales before they are finally tied. The ends of the band when the bale is nearly compressed are about in a position as shown in Fig. 2, one end of the band being secured to a loop 20, through which its other and free end 21 passes. The object now is to pull as much of the loose band through loop 20 as is possible and to bring its other end, with the loop, as close up against the bale as may be done, so as to take all the slack out of the former. For the purpose of pulling as much of the band through loop 20 as is possible its free end 21 is passed between and held by two jaws 22 and 23, connected to an arm 24, which is hung, preferably, in series upon a shaft 25. One of these jaws is rigidly connected to or forms part of arm 24, while the other is movable thereon. This shaft 25 is held in bearings 26, bolted to the press-frame 13. To each side of arm 24 are located collars 27, having grooves 38, which engage with a feather 28, secured to shaft 25.

29 are tension-springs connected with each one of their ends to one of the collars 27 and passing around these collars several times and then around the under side of arms 24. When shaft 25 performs a partial revolution in the direction indicated by an arrow in Fig. 3, arms 24 will move outwardly, being carried forward by the middle portion of springs 29, the ends of which springs are secured to collars 27, which revolve with shaft 25.

30 is a stationary cam located to one side of arm 24 and so shaped that when it comes in contact with lug 31, which extends laterally from the upper end of the movable jaw 23 and moves with arm 24, said jaw will be pushed toward jaw 22 and held there during the remainder of the movement of arm 24, and in such position grips tightly the free end of the tie-band. This cam is cut out interiorly, so as to permit shaft 25, with its feather, to pass freely through it and prevent it from interfering with their movements. A spring 48, occupying a chamber cut out of the contiguous surfaces of arm 24 and the extension of jaw 23, serves to throw the jaws open when not held closed by cam 30.

Inasmuch as the tension required to draw the bands tight is not exactly alike in all cases nor the same for every individual band, it is desirable that each one of the arms 24 should move independently and continue to move as long as necessary to draw each band held by its jaws as tight and close around the bale as the power operating the device permits. This is accomplished by having a large portion of the inside of the hubs of arms 24 cut out, as shown at 47, to prevent feather 28 from affecting the former and make their motions independent from the direct movement of shaft 25. While this is going on another arm 32, hung upon a shaft 33 and below and behind each one of arms 24, moves inwardly toward the bale, as indicated by an arrow in Fig. 3. This arm terminates in a fork, the members of which pass over and down to either side of the band, so as to catch loop 20 for the purpose of pushing the same back against the bale and as close to it as possible. The manner of connecting these arms to their shaft is similar to the connection described in the case of arms 24, they also having cut-outs at 47, and which connection therefore is not positive, inasmuch as not all said arms move to and stop at the same points. Nor are loops 20 necessarily always in the same positions. Collars 34, similar to collars 27, are situated on either side of arms 32 and have similar springs 35, like in the former case, connected to them. As these arms, however, move in a direction opposite to the one of arms 24, the middle branch of these springs passes around arms 32 in a different manner and so as to pull said arms in the proper direction. The extent and duration of the revolution of shafts 25 and 33 is sufficient to turn the arms 24 and 32 a distance which meets all extreme requirements. Should any one of the bands be drawn sufficiently tight before the shafts stop rotating, the particular arms 24 and 32 acting upon such bands will stop moving, while feathers 28 and 40 advance in the spaces or cut-outs 47 in the hubs of these stopping arms and cannot affect these latter, thereby preventing possible injury to the parts and permitting the other arms, not having completed their task yet, to continue. The several coils of springs 29 and 35 permit the collars to move with the shafts without materially affecting the arms which have stopped, because said coils by being drawn together or wound upon their collars permit the springs to stretch sufficiently. This is shown plainly in Fig. 3, where arms 24 and 32 are stopping, having completed their work and drawn the band tight enough, and cannot be affected by feathers 28 and 40 should shafts 25 and 33 continue to revolve.

In Fig. 4 the position of feather 28 within cut-out 47 is shown in a case where arm 24 has completed its task before shaft 25 stops rotating. In some cases where presses are very large and the bales do not always occupy the full extent of the platen, and it being not desirable nor necessary to have a set of arms 24 and 32 for each one of grooves 16 and 17 of the platens, and for the further reason that the tie-bands are never put so close together as to have one of them in each one of said grooves, a limited number only of such sets of arms is provided, which sets by being made adjustable in a lateral direction are sufficient for all practical purposes. To accomplish this lateral adjustment, lugs 39 are provided on either side of the collars of arms 32 and secured to a sliding plate 36, moving in guides 37, to which plate, also, cams 30 connect. If this plate is moved laterally, all the arms 24 and 32 move with it, on account of their confinement between cams 30 and lugs 39. Shaft 33 has a feather 40, which, like feather 28 of shaft 25, runs clear through the length of said shaft and between its bearings, so that in any position to which arms 24 and 32 may be laterally adjusted their adjacent collars, by which said arms are operated, are always in position and ready to be acted upon and rotated by these shafts and through the medium of the feathers thereon.

Plate 36 may be moved and locked in its adjusted positions by various different means. One of them consists by connecting to it a rod 41, having a handle 42 and notches 43. The distance between these latter corresponds with the distance between grooves 16 and 17, and when one of them drops over a stop 44 plate 36 is locked in such position as to bring arms 24 and 32 always in ready position to act upon the ends of the tie-bands. The two shafts 25 and 33 may commence and stop their rotary movements at the same time, in which case cog-wheels 45 and 46, intermeshing with each other, are provided. As the movement of arms 32 is more limited than the movement of arms 24, it follows that shaft 33 does not need such an extensive rotary movement, which inequality of movements is attained by proportioning the diameters of the gear-wheels 45 and 46 accordingly. It might be mentioned here that neither one of the shafts makes a complete revolution, and about a quarter-turn for shaft 25 is considered sufficient.

The whole mechanism is driven by applying power to either one of shafts 25 or 33. This power may be either hand-power or power derived from the motor driving the press, or it may be the power of an independent motor. When all arms 24 and 32 have been moved to their extreme positions and each set has individually drawn its band around the bale as tight as possible, the movement of the shafts is stopped. They, with the arms, are returned to their normal positions and all the free ends 21 of the bands are secured and tied to loops 20 in a suitable manner.

The device may do most of its work at the same time while the press is doing its work, whereby the two operations will finish almost simultaneously, or the device may be started after the bale has been compressed.

Our invention may be used, of course, for similar purposes in connection with other objects than cotton-bales.

Having described our invention, we claim as new—

1. In a device for drawing tie-bands around bales, arms capable of engaging with the ends of a tie-band for the purpose of pulling the same close around the bale, a pivot upon which these arms, preferably arranged in series, are hung, tension devices, one for each arm and secured to this pivot, which latter is common to all arms and by which the rotary motion of this pivot is transmitted to said arms, and means to actuate the pivot, all as substantially shown and described.

2. In a device for drawing tie-bands around bales, an arm capable of gripping the free end of a tie-band for the purpose of pulling it closely around the bale, an elastic tension device connected to this arm and operating it in a manner to cause it to move away from the bale, and mechanism actuating this tension device, which latter by reason of its elasticity yields sufficiently to permit the mechanism actuating it to finish its movement in cases where the operation of the arm stops before that time, all as substantially shown and described.

3. In a device for drawing tie-bands around bales, two pivoted arms preferably arranged in series and adapted to engage with their outer free ends with the ends of a tie-band, tension devices which engage with each one of these arms and cause them to rotate on their pivots, and mechanism which actuates these tension devices in a manner to cause the arms of one series to rotate in a direction opposite to one of the arms of the other series, said tension devices by reason of their elasticity yielding sufficiently to permit any of the arms to stop at any time prior to the time when the mechanism actuating them stops, all as substantially shown and described.

4. In a device for drawing tie-bands around bales, arms preferably arranged in series and capable of engaging with the ends of the tie-bands, a shaft upon which the whole series of arms is hung, and elastic devices secured to this shaft and connected to the arms thereon, whereby the shaft when rotating is enabled to impart a swinging motion to said arms, which motion, however, as to its duration is independent from the rotary motion of the shafts and by reason of the yielding connection between them and the arms allows these latter to stop at any time previous to the termination of the rotation of the shafts, all as substantially shown and described.

5. In a device for drawing tie-bands around bales, two series of arms, the ends of one of these series provided with forks, the other with movable jaws, whereby they are enabled to act upon the ends of the said tie-bands, shafts upon which these arms are hung, means secured to said shafts and engaging with the arms for the purpose of imparting the motion of the shafts to the arms, said means being sufficiently elastic to permit the shafts to continue their rotation should any or all of the arms hung on them stop, and stationary cams located within the paths of the arms having the jaws, whereby these latter are closed upon coming in contact with said cams, all as substantially shown and described.

6. In a device for drawing tie-bands around bales, a series of arms capable of grasping and acting upon the ends of the said tie-bands for the purpose of pulling them closely around the bale, shafts upon which they are supported, collars secured to either side of said arms on the shafts and operatively connected with said shafts, and elastic or yielding means connecting said collars with said arms for the purpose of operating them, which means permit each one of the arms to stop independently and be not affected by the rotary movement of the shafts should the same continue, all as substantially shown and described.

7. In a device for drawing tie-bands around bales, arms preferably arranged in series and capable of engaging with the ends of the tie-bands, a shaft upon which the whole series of arms is hung, elastic devices secured to this shaft and connected to the arms thereon, whereby the shaft when rotating is enabled to impart its motion to said arms, which motion as to its duration, however, is independent from the rotary motion of the shaft, and means to rotate the shaft, all as substantially shown and described.

8. In a device for drawing tie-bands around bales, a series of arms capable of acting upon the ends of the bands for the purpose of pulling them closely around the bales, shafts upon which said arms are supported, elastic means secured to said shafts and engaging with the arms for the purpose of actuating them, means whereby the shafts are rotated, and means whereby all said arms are adjusted laterally to suit the position of the bale, and means to lock said arms in their adjusted position, all as substantially shown and described.

9. In a device for drawing tie-bands around bales, an arm for pulling the free end of a tie-band through the loop to which the other end of said band is secured, jaws connected to this arm for gripping the tie-band, a cam acting upon the movable jaw and closing the same, a spring 29, operatively connected to this arm, collars to which the ends of this spring are secured, a shaft upon which said collars are operatively affixed, and means for rotating the shaft, all as substantially shown and described.

10. In a device for drawing tie-bands around bales, an arm for pushing the loop to which one end of a band is secured close against the bale, the free end of this arm constructed and shaped to be capable of engaging with and acting upon said loop, a spring 35, operatively connected to this arm, collars to which the ends of this spring are affixed, a shaft upon which said collars are operatively secured, and means for rotating the shaft, all as substantially shown and described.

11. In a device for drawing tie-bands around bales, series of arms capable of engaging with the ends of the tie-bands, shafts upon which these arms are hung, and tension devices secured to said shafts and engaging with said arms, these latter provided with cut-outs 47 to permit the shafts to rotate without affecting the arms in cases where these latter stop, all as substantially shown and described.

In testimony whereof we affix our signatures in presence of two witnesses.

JOSEPH J. MARTIN.
WILLIAM H. BROWNFIELD.

Witnesses:
CHAS. SPENGEL,
ALFRED M. DAVIES.